(12) United States Patent
Reynolds, Jr. et al.

(10) Patent No.: US 7,247,213 B2
(45) Date of Patent: Jul. 24, 2007

(54) METHOD FOR MANUFACTURING A CONNECTION FOR COMPOSITE TUBING

(75) Inventors: Harris A. Reynolds, Jr., Houston, TX (US); Thomas J. Walsh, Houston, TX (US); Chris A. Lundberg, Kingwood, TX (US); Joel D. Shaw, Houston, TX (US)

(73) Assignee: Future Pipe Industries, Inc., Houston, TX (US)

( * ) Notice: Subject to any disclaimer, the term of this patent is extended or adjusted under 35 U.S.C. 154(b) by 526 days.

(21) Appl. No.: 10/694,553

(22) Filed: Oct. 27, 2003

(65) Prior Publication Data

US 2004/0088849 A1    May 13, 2004

Related U.S. Application Data

(62) Division of application No. 09/664,013, filed on Sep. 19, 2000, now Pat. No. 6,676,169.

(60) Provisional application No. 60/155,328, filed on Sep. 22, 1999.

(51) Int. Cl.
*B65H 81/00* (2006.01)

(52) U.S. Cl. .................. 156/172; 156/169; 156/173; 156/175

(58) Field of Classification Search ............. 156/172, 156/169, 173, 175
See application file for complete search history.

(56) References Cited

U.S. PATENT DOCUMENTS

| 4,187,135 | A |   | 2/1980  | Yates et al. |
| 4,695,341 | A | * | 9/1987  | Matuska et al. ............ 156/172 |
| 4,963,210 | A | * | 10/1990 | Corr et al. ................. 156/172 |
| 5,160,392 | A | * | 11/1992 | Thongs, Jr. ................ 156/172 |
| 6,379,763 | B1 | * | 4/2002 | Fillman .................... 428/36.9 |

FOREIGN PATENT DOCUMENTS

EP     0907049 A2 *  4/1999

OTHER PUBLICATIONS

Office action issued in corresponding Canadian patent application No. 2,320,028 dated May 5, 2006; (2 pages).

* cited by examiner

*Primary Examiner*—Jeff H. Aftergut
(74) *Attorney, Agent, or Firm*—Osha Liang

(57) ABSTRACT

A method for manufacturing a connection for composite tubing is disclosed. The method includes maintaining tension on the composite fibers while "winding in" the connector to the composite tubing. The tension on the fibers results in the fibers bridging across traps of the connector as they are being wound. The bridging results in improved load bearing characteristics of the connection.

23 Claims, 9 Drawing Sheets

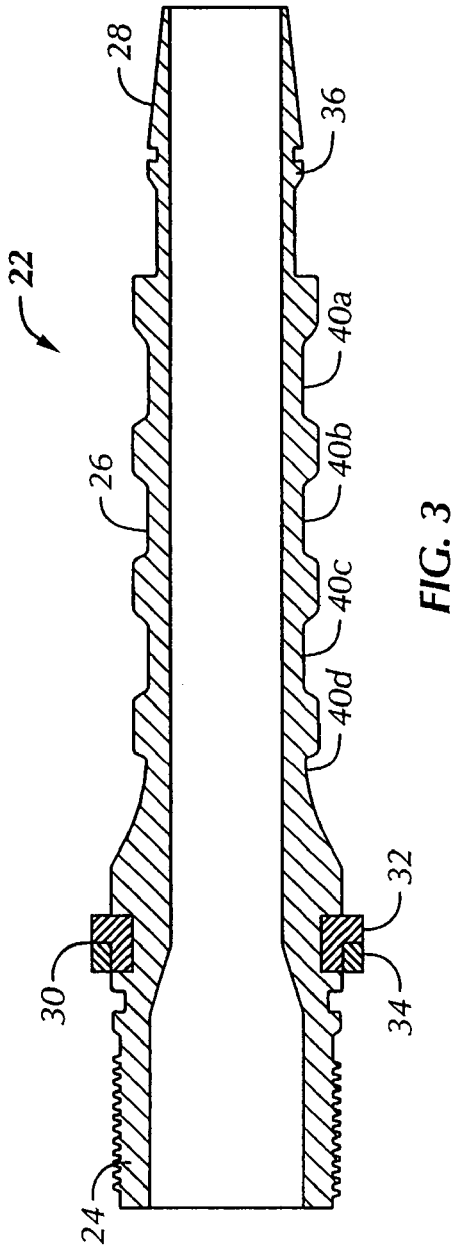
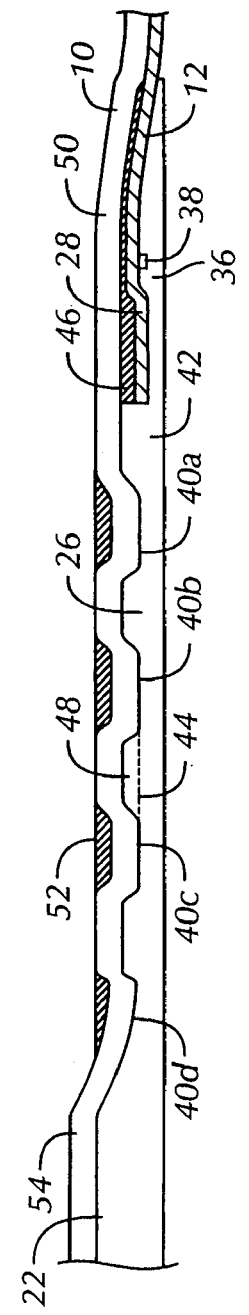
FIG. 3
FIG. 4

METHOD FOR MANUFACTURING A CONNECTION FOR COMPOSITE TUBING

This application is a divisional application of U.S. patent application Ser. No. 09/664,013, filed Sep. 19, 2000, now U.S. Pat. No. 6,676,169, which claims priority to U.S. Provisional Patent Application No. 60/155,328, filed Sep. 22, 1999, which is incorporated by reference in its entirety.

STATEMENT AS TO FEDERALLY SPONSORED RESEARCH

The U.S. Government has a paid-up license in this invention and the right in limited circumstances to require the patent owner to license others on reasonable terms as provided for by the terms of Award #70NANB5H1053 awarded by the Department of Commerce, National Institute of Standards and Technology—Advanced Technology Program.

FIELD OF THE INVENTION

The invention relates to composite tubing and more particularly to couplings for composite tubing.

BACKGROUND OF THE INVENTION

Fiber reinforced composite materials are known in the art and desirable for various applications due to their lightweight, high strength characteristics. One application for composite materials is pipe that is made in tubular form with a fiber reinforced plastic material. Segments of the composite pipe have a significant use in the petroleum industry. However, in typical petroleum industry applications, the composite pipe will be subjected to high loads. Ideally, couplings which join the segments of the pipe should have the ability to withstand the same pressures and loads that are exerted on the pipe itself.

Composite pipe is commonly manufactured by winding or braiding reinforcing composite fibers that are impregnated with resin over a mandrel and/or an interior liner made of a thermoplastic or elastomeric material. The reinforcing fibers may be glass, carbon or other suitable material. The resin is later cured to form hard tubing. The fibers are typically in the form of filaments or "tows" which are wound around the interior plastic liner or the mandrel to form the pipe.

Composite pipe is commonly manufactured in discrete lengths, usually up to about 30 feet in length, by the filament winding process where the mandrel is rotated within the filaments. Alternately, the tube may be manufactured as a continuous tube by either braiding or filament wrapping over a non-rotating winding mandrel which becomes an integral liner of the finished tube. FIG. 1 shows an example of a segment of composite pipe as it is being manufactured. The composite pipe 10 is formed as fibers 14 are wound around a plastic liner 12. FIG. 2A illustrates a type of filament winding machine 16 that is commonly used to manufacture composite pipe 10. The plastic liner 12 or a mandrel is drawn through several filament spool frames 20. These frames 20, as shown in FIG. 2B, rotate around the liner 12 while filament spools 18 unwind to extend fibers 14 which are then wound onto the liner 12 to form the composite pipe 10. When the desired length of the segment of pipe is reached, a connector must be added so that the segment can be attached to other segments of pipe. Consequently, it is advantageous for a connector for composite pipe to provide similar strength characteristics as the composite pipe when the two segments of pipe are attached together.

Prior art connectors for high-strength composite pipe for petroleum industry applications include the following types: (1) pinned joints that carry loads through radially oriented pins; (2) bonded joints that carry loads through the shear strength of an adhesive layer; (3) mechanically locked wedge-type joints that carry loads through a mechanical wedge; and (4) trap-type joints. The trap-type joint carries loads from the composite pipe to the connector by means of the composite fibers. The composite fibers are wound into grooves in the end of the end connector affixed to the composite pipe and are trapped in the groove by subsequently applied "hoop" or circumferential fiber windings. The trap-type joints are generally considered to provide the highest load-carrying capacity of the known composite connector types.

In the prior art, the fibers used with trap-type connectors are commonly "wound into" the composite tube itself during the manufacturing process. The strongest prior art trap-type joint is most commonly provided by a discrete length filament winding. Alternatively, trap-type joints may be attached to an already cured composite pipe by applying additional fiber windings that are adhesively bonded to the cured pipe.

Prior art connectors include multiple grooves or traps for the stronger connections. Each fiber layer of the composite pipe typically carries the load to a selected trap for that particular layer. For example, where the pipe has five distinct fiber layers, the trap-type connector may have five separate traps or grooves (i.e., one for each layer). After each composite layer is completed, a hoop wrap is applied over the trap. The hoop wrap completely fills the trap while holding the fibers in place. The excess fiber extending beyond the trap may be trimmed at the distal end of the trap. The shape of the trap may be designed with various angles. This design allows the windings of each layer to lay against the bottom of the trap. This avoids "bridging" the fibers across the trap as they are wound.

SUMMARY OF THE INVENTION

One aspect of the invention is a method for making a connection for composite pipe. The method includes attaching a connector having at least one trap to a segment of composite pipe comprising a plurality of filament fibers, winding the plurality of filament fibers across the end connector, wherein tension is continuously maintained on the filament fibers so that the filament fibers bridge across the at least one trap. The plurality of filament fibers that bridge across the at least one trap are compressed, and a binder interspersed in the filament fibers is then cured while tension on the fibers is maintained. In one embodiment, the connector has a plurality of traps. In one embodiment, the fibers in each trap are wrapped with a hoop wrap. In one embodiment, the hoop wrap in each trap has a modulus related to the position of the trap with respect to the end of the connector. In one embodiment, a flank angle of each trap is related to the position of the trap with respect to the end of the connector. In one embodiment, the width of each trap is related to the position of the trap with respect to the end of the connector. In one embodiment, the depth of the trap is related to the position of each trap with respect to the end of the connector.

Other aspects of the invention will be apparent from the description which follows.

BRIEF DESCRIPTION OF THE DRAWINGS

FIG. 3 shows a cross-sectional view of a threaded connector.

FIG. 4 shows a cross-sectional view of the composite trap and the liner trap sections of a connector with an attached segment of composite pipe.

DETAILED DESCRIPTION

Figure 1:
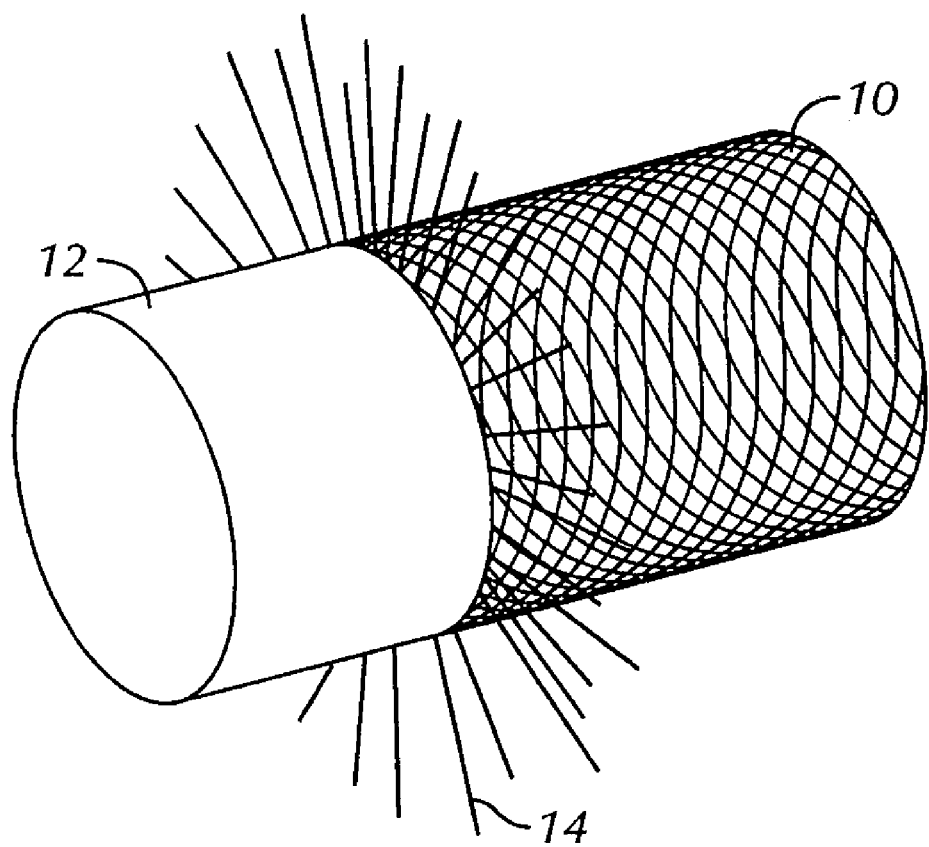
FIG. 1 shows a segment of composite pipe with a thermoplastic liner being manufactured.
Figure 2A:
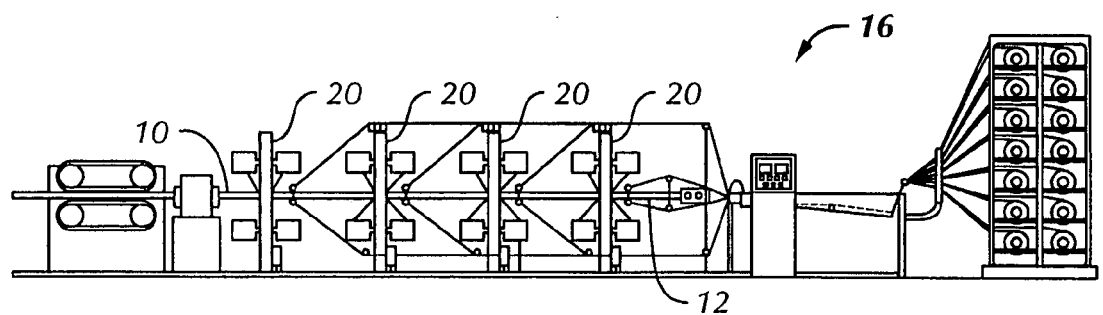
FIG. 2A shows an embodiment of a filament winding machine that is used to manufacture composite pipe.
Figure 2B:
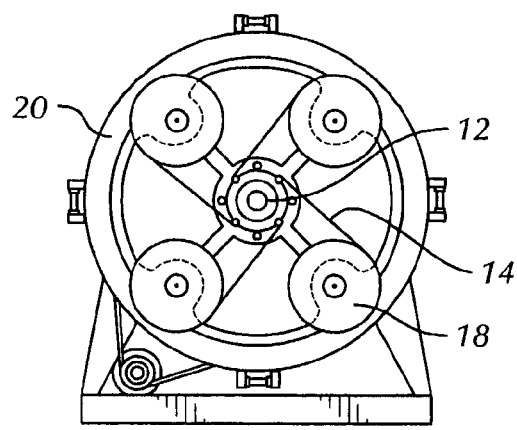
FIG. 2B shows a filament spool winding frame that winds fibers onto the composite pipe.

Exemplary embodiments of the invention will be described with reference to the accompanying drawings. Like items in the drawings are shown with the same reference numbers.

A coupling or connector for joining segments of fiber reinforced composite pipe and a method for manufacture of the same has been developed that offer improved performance by increased resistance to bursting, collapsing, and compression, tension, and differential pressure loads than prior art connections are able to withstand. FIG. 3 shows a cross-section of a typical threaded connector 22 for composite pipe. While a connection which uses threads is a common configuration, other embodiments may include flanged and hub couplings or other specialized couplings. The connector 22 shown in FIG. 3 can be used with both rotating and non-rotating mandrel manufacturing processes.

Figure 5:
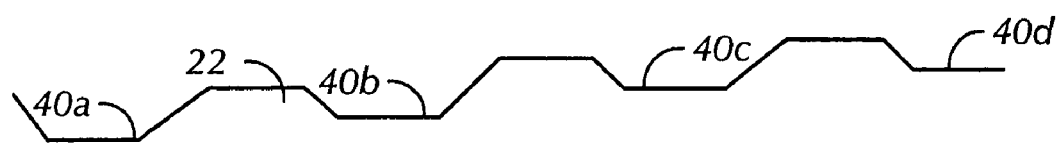
FIG. 5 shows one embodiment of a connector with "stair-stepped" traps.

As shown in FIG. 3, the connector 22 has three distinct sections: the threaded section 24; the composite trap section 26; and the liner trap section 28. The threaded section 24 of the connector 22 is shown with a metallic split ring shoulder 30 which is made up of a split ring 32 and a lock ring 34. The composite trap section 26 is shown with several composite traps 40a–d that are used to secure the composite layer of the tubing to the connector. The liner trap section 28 is shown with a liner bump 36 that attaches the liner of the composite pipe section to the connector 22. While four separate traps 40a–d are shown, any number of traps could be used to provide the desired characteristics of the connector 22. It is also contemplated that the length, depth and angular profile of each trap 40a–d may be varied to provide better performance of the connection. FIG. 5 shows an alternative design that uses "stair-stepped" traps 40a–d for the connector 22.

FIG. 4 shows a section of a connector 22 that has been "wound-in" to a composite tube 10 with a thermoplastic liner 12. Where the tube 10 has the thermoplastic liner 12, the first step in attaching the connector 22 according to the invention is to install a seal 38 on the end of the connector 22. O-rings 38 including high durometer back-up rings are preferred where the maximum pressure differential will exceed 5000 psi. The next step is to swage or "bell out" the end of the liner 12 using a heated, cone-shaped swaging tool. The swaging tool should be heated to approximately 50–60% of the thermoplastic material's characteristic softening temperature. The effect is to expand the end of the liner 12 enough to allow the end of the connector 22 to fit inside. The next step is to heat the connector 22 and push it into the liner 12 until the liner 12 contacts the shoulder 42 of the connector 22. After the liner 12 has cooled, it will relax to its original shape and fill in over the liner trap bump 36. Next, liner hoop wraps 46 are wound over the liner 12 and the liner trap section 28. The liner hoop wraps 46 are preferably impregnated with a quick-curing resin which has the same or higher glass-transition temperature as the resin used in the composite pipe. A fiber sold under the trade name KEVLAR by E.I. duPont de Nemours & Co., Wilmington, Del., is a preferred material for the hoop wraps 46 because it has a negative coefficient of thermal expansion (i.e. it shrinks when heated). Finally, the hoop wraps 46 are over-wrapped with a shrink-wrap tape (not shown) and quickly heated to the cure temperature of the resin. The hoop wraps 46 and the tape (not shown) will shrink and consequently tighten when heated, thus ensuring a tight installation of the liner 12 on the liner trap section 28 of the connector 22.

Vulcanize-in-place elastomeric liners can be used in lieu of thermoplastic liners, but they require an internal mandrel (usually steel or aluminum) to form the interior elastomeric liner. With vulcanize-in-place liners, the connector 22 is cleaned and may be primed with an epoxy-based metal primer and then coated with a standard epoxy adhesive. The connector 22 is secured to the mandrel (not shown) and a strip of the elastomeric material is wound over the connector, usually with about 50% overlap. The elastomeric strip can be vulcanized-in-place before or after the composite is wrapped.

After the liner 12 is installed on the liner trap section 28 of the connector 22, the composite layer 50 is wound across the composite trap section 26 using the same fibers, resin, winding angles, and curing technique used to manufacture the adjoining composite tubing 10. After the fibers are wound across the traps 40a–d, they must be compressed into the traps 40a–d before the composite layer 50 is cured. The fibers can be compressed in several ways: (1) with hoop wraps; (2) with a split die machined to the desired trap profile; or (3) with shrink-wrap tape; (4) overlaying a fiber layer using a subsequent fiber layer having a higher lay angle. FIG. 4 shows a compression method using composite trap hoop wraps 52 with each trap 40a–d. Hoop wraps have the advantage that their application is an automatic process, while the split dies and the shrink-wrap tape are manual operations.

It is advantageous, especially in petroleum industry applications, to have a connection at the end of a composite tube which carries internal/external pressure loads effectively and has a very thin wall design. Ideally, the connection will be externally and internally flush with the composite tube body. Alternatively, a flush outside diameter (OD) or a flush inside diameter (ID) connection is advantageous. The connection is designed for the minimum wall thickness possible according to the following parameters: (a) the cross sectional area of the connector 22 at the trap thickness 44 must have sufficient strength to carry 100% of the load carried by the composite tube; (b) the liner trap bump 36 should be between 50–100% of the liner 12 thickness; (c) the OD of the liner trap bump 36 should be greater than the ID of the liner 12 so that the liner can be "swaged" onto the liner trap bump 36; (d) the trap thickness 44 should be 50–100% of the composite layer 10 thickness. If the trap thickness 44 is equal to the liner bump 36 height and the trap bump height 48 is equal to or less than the thickness of the liner 12, then the wall thickness of the connection will be the sum of the trap thickness 44, the trap bump height 48, and the thickness of the composite layer 50. Since the section of the composite layer 54 which extends beyond the last trap will be ground down after curing, the minimum thickness of the connection will be limited only by the thickness of the liner trap bump 36 and the trap bump height 48. An additional method for further reducing the minimum thickness of the end connection, particularly if using a very thick liner, is thinning the liner 12. This thinning of the liner 12 is done at the liner trap section 28 by machining away the liner material after the liner 12 is joined to the connector 22.

For high pressure applications, one embodiment of the present invention will be between 50–65% thicker than the composite tube upon which it is installed. The dimensions for such an embodiment, a flush OD connection for composite coiled tubing (CCT), are:

| Liner | Composite Layer | End Connection | End Connection/ Composite Tube Thickness Ratio | Trap Thickness | Liner Trap Bump |
|---|---|---|---|---|---|
| 1.000" ID | 1.200" ID | 0.675" ID | 1.65 | 0.112" | 0.162" |
| 1.200" OD | 1.500" OD | 1.500" OD | | | |
| 0.100" thick | 0.150" thick | 0.412" thick | | | |

This embodiment has been burst tested to 19,500 psi. In this test, a failure occurred in the composite tube body but not at the connection. The 0.675" ID dimension is required for the strength of the "Stub Acme" thread used on the particular end connection. It is not required for the strength of the composite joint.

CCT is a special case since it is typically very small diameter. Additionally, it does not rotate in service and it requires low-profile torque connections. In order to maximize the ID of a CCT connection fitted with Stub Acme threads while maintaining a flush OD, a removable split ring shoulder 30 (shown in FIG. 3) may be added to the connector 22. This increases the through-bore ID to 0.750" as compared to the 0.675" ID of the flush-shoulder connection.

The design and number of the traps is also an important factor in determining the performance of the connection. Multiple traps may be required for high axial loads or improved fatigue performance with cyclical loading. In order to efficiently share the loads between the traps, it is advantageous to minimize the load on the first trap (the trap nearest the composite tube) and maximize the load on the later traps (the traps closer to the end of the connector). There are several variables that can be modified to accomplish this:

| Variable | First Trap | Later Traps |
|---|---|---|
| Load Flank Angle | Low Angles (e.g. 30°) | Higher Angles (e.g. 50–60°) |
| Hoop Wrap Fibers | Lower Modulus (e.g. Kevlar, Glass, Hybrids) | High Modulus (e.g. Carbon Fiber) |
| Height & Depth of Trap | Short, Shallow Trap | Longer, Deeper Trap |
| Shear Ply between Trap and Composite | Low Shear-Strength Shear Ply (e.g. Rubber) | Higher Shear-Strength Shear Ply (e.g. Primer & Adhesive) |

The elastic modulus of the hoop wrap fibers can also be varied by using varied ratios of material. For example, the first trap can use hoop wraps of 80% fiberglass and 20% carbon, while the last trap can use hoop wraps of 80% carbon and 20% fiberglass. The depth of the trap in the above table can be adjusted both by selecting the height of the trap walls, and by adjusting the thickness of the connector body below the trap floor.

Figure 6:
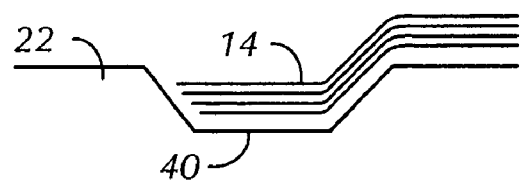
FIG. 6 shows a prior art method of winding truncated fibers across a trap.
Figure 7:
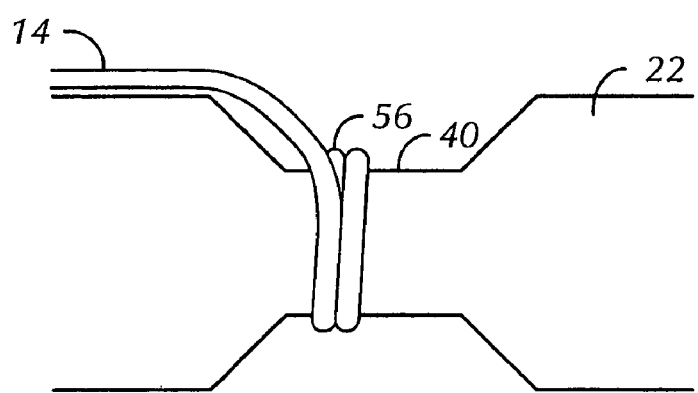
FIG. 7 shows a prior art method of dwell winding non-truncated fibers across a trap.
Figure 8:
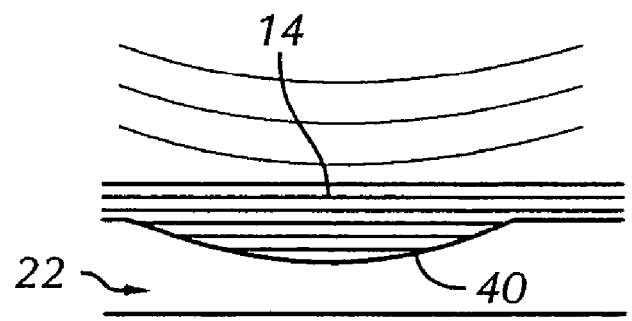
FIG. 8 shows a prior art method of winding truncated fibers across a hyperboloid-shaped trap.

It has been determined that an important factor in the performance of the connection is the tension of the fibers running through the traps before the composite is cured. FIG. 6 shows one example of a prior art winding method where the fibers 14 are truncated or cut and laid in the bottom of the trap 40 before they are compressed and held in place by hoop wraps. FIG. 7 shows an alternative prior art method of winding with uncut fibers. Instead of cutting the fibers 14 in the bottom of the trap 40, the fibers 14 are wound into the trap 40 and a series of dwell (stationary) wraps 56 are completed before the direction of the winding is reversed. In this prior art method, the fibers 14 are not kept in tension nor do they "bridge" across the trap. FIG. 8 shows still another prior art method of winding the fibers. In this method, the trap 40 is formed in a hyperboloid shape in order to allow the truncated fibers 14 to lay flat against the bottom of the trap 40. This prevents the fibers 14 from "bridging" during the winding.

Figure 9:
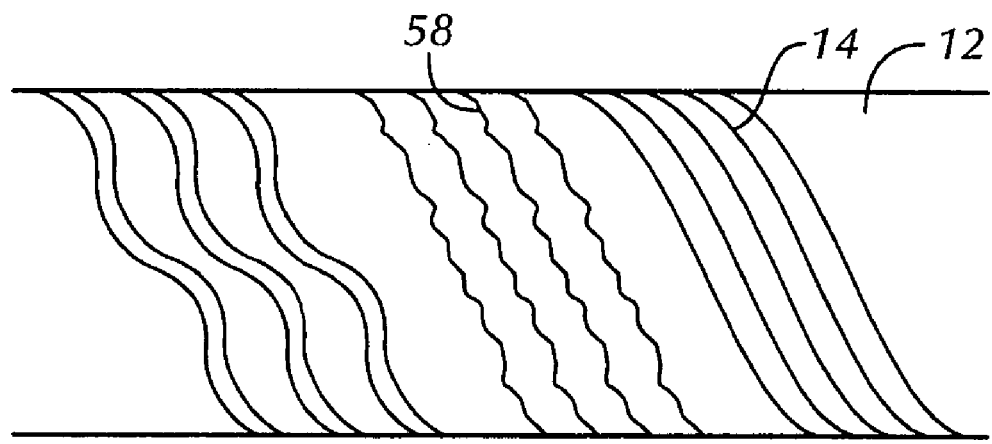
FIG. 9 shows fibers on a composite tube that exhibit "micro-waviness".
Figure 10:
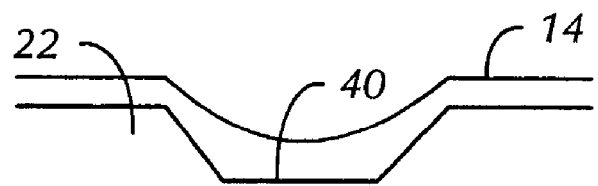
FIG. 10 shows an example of "bridging" across a trap in accordance with one embodiment of the present invention.
Figure 11:
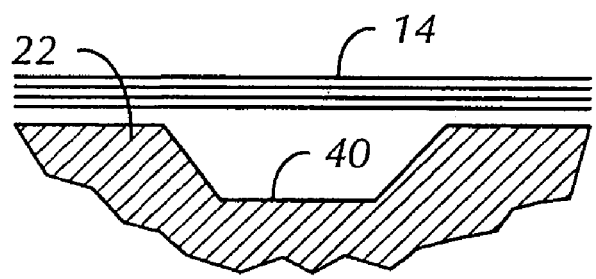
FIG. 11 shows filament fibers that are held under tension and bridge across a trap in accordance with one embodiment of the present invention.
Figure 12:
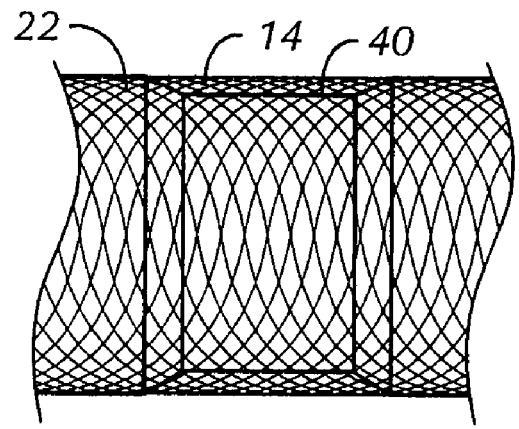
FIG. 12 shows a view of a segment of a connector with filament fibers bridging across a trap of the connector in accordance with one embodiment of the present invention.
Figure 13:
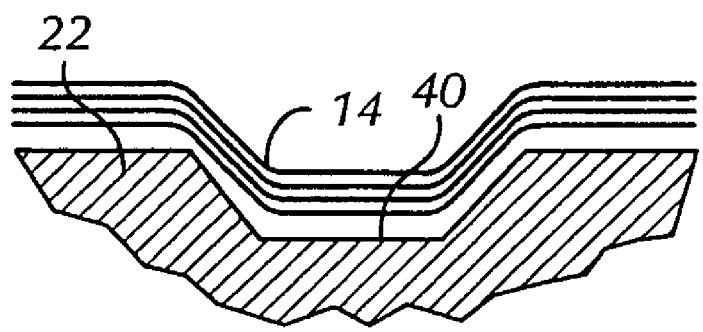
FIG. 13 shows filament fibers that are held under tension and compressed in accordance with one embodiment of the present invention.

In the invention, it is preferred that as the fibers that are laid across the traps they remain in tension throughout the manufacturing process so that prior to compression into the traps, the fibers tend to "bridge" the trap. FIG. 10 shows an example of "bridging" where the fiber 14 is held under tension during the winding across the trap 40. As a result, the fiber 14 does not contact the bottom of the trap 40. This allows, after proper compression of the fibers into the trap, the various loads to be fully transferred to the connector through the fibers. It is preferred that the fibers not be truncated before the cure of the composite. If the fibers are truncated before the cure, they will not have a tension sufficient to carry the load to the connector when compressed into the traps. The fibers that are not properly tensioned will tend to exhibit what is referred to as "microscopic waviness" within the fiber layer, which indicates an inability to carry a sufficient load. FIG. 9 shows an example of fibers that exhibit "microscopic waviness" 58 as compared with fibers 14 that are properly tensioned and do not exhibit microscopic waviness. Additionally, it is preferable to wind the fibers of all layers of the composite through all of the traps. If a particular layer is truncated at a particular trap, the addition of a hoop wrap is insufficient to transfer the load between the traps. FIG. 11 shows the results of the preferred winding method of the present invention wherein the fibers 14 are kept in tension during the winding so that they bridge the trap 40 before compression. FIG. 12 shows an alternative view of the present invention with the fibers 14 bridging the trap 40 on the connector 22 before compression. FIG. 13 shows the results of the preferred winding method after compression of the fibers 14 into the bottom of the trap 40.

Continuous manufacturing techniques of composite tubing allow tension to be maintained across the traps as the fiber is wound in one direction only. Filament winding methods require that the fiber winding direction be reversed with every traverse of the mandrel. In order to maintain the required fiber tension during filament winding, it is preferable that the fibers be wound onto the mandrel for a distance of ten mandrel diameters past the end of the composite traps. Two dwell (stationary) wraps should be made at this point before the winding direction is reversed.

Figure 15:
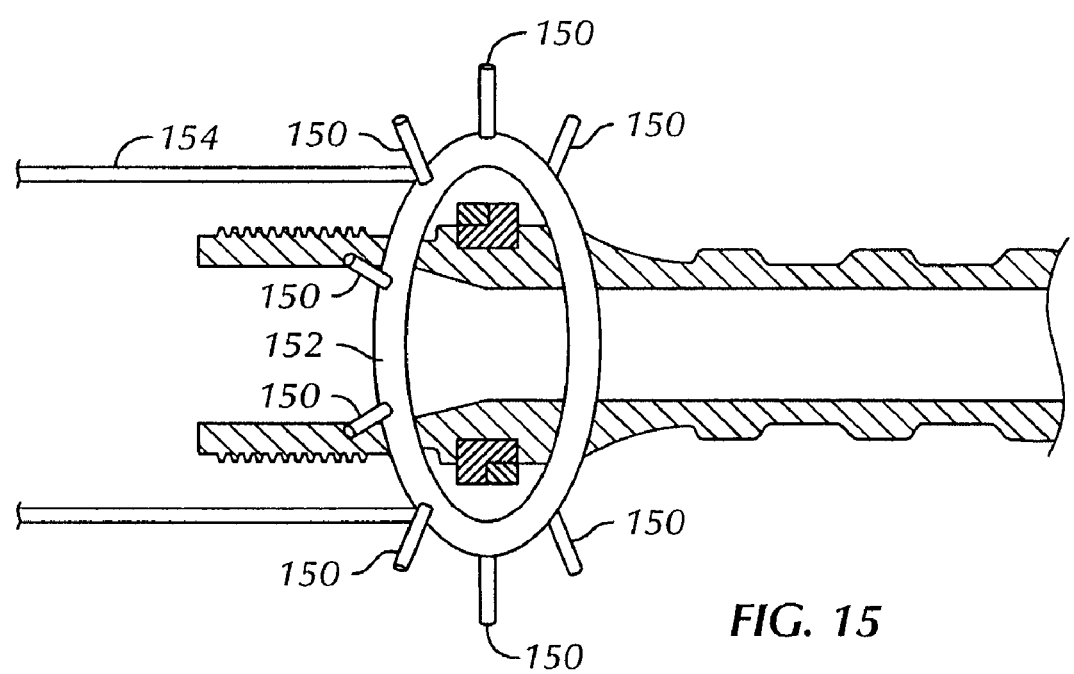
FIG. 15 shows a tensioning ring used to maintain tension on the fibers during cure.

Alternatively, tension on the fibers can be maintained during cure by winding the fibers on to a tensioning ring at the point at which the wind direction is reversed. Referring to FIG. 15, a tensioning ring 152 is positioned at the distal end of the connector 22. As the fibers (not shown in FIG. 15) are applied to the exterior of the connector 22, eventually they will reach the axial position of the ring 152. The ring 152 includes a plurality of azimuthally spaced apart pins 150. As the fibers are wound past the pins, the winding direction is reversed. The fibers will at that point wrap around the pins 150. Wrapping the fibers can then proceed in the reverse direction. After winding is complete, the ring 152 can be pulled axially away from the composite tube.(not shown in FIG. 15) by means of an hydraulic retraction mechanism 154 or any similar retraction device so as to put the fibers in tension. Then the fibers need to be pulled down into the traps while tension is maintained thereon. The ring 152 can then be returned to its original position after resin cure is complete, and the fibers can be truncated.

Figure 14:
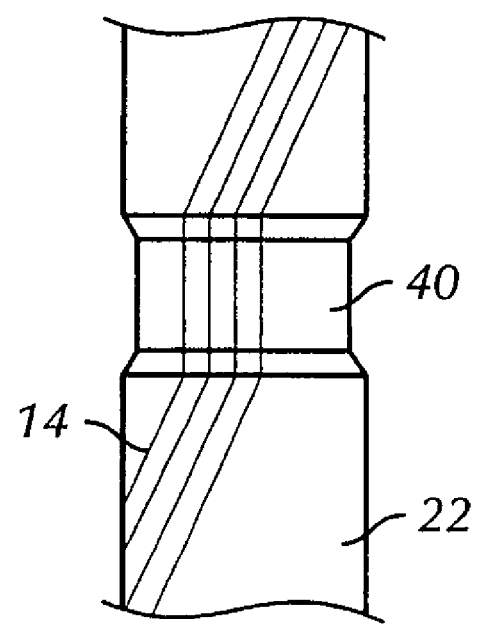
FIG. 14 shows a reduced axial angle of filament fibers after compression in accordance with one embodiment of the present invention.

It is preferred that the tension of the fibers be increased just before the cure by compressing all of the fibers down into the traps. Compressing the fibers into the traps will make the wound-fiber angles more shallow as the tension is increased by compression. FIG. 14 shows the change in the axial angles of the fibers 14 in the trap 40 after compression. The shallower angles will actually improve the tensile load carrying capacity of the connection. Fibers that are not compressed into the traps will not carry as much load. Further, they will also exhibit some degree of "microwaviness" even if they are not truncated. It is preferable to wind perforated polyester shrink-wrap tape over the traps 40 to compress the fibers 40. Typical applications may include three layers of tape that provides pressure of about 60 psi when the tape is shrunk. In the invention, shrink wrap compressed traps alone, without the use of hoop wraps, have provided burst test pressures within 80–90% of the burst test pressures attained using connections with hoop wrapped traps.

Figure 16:
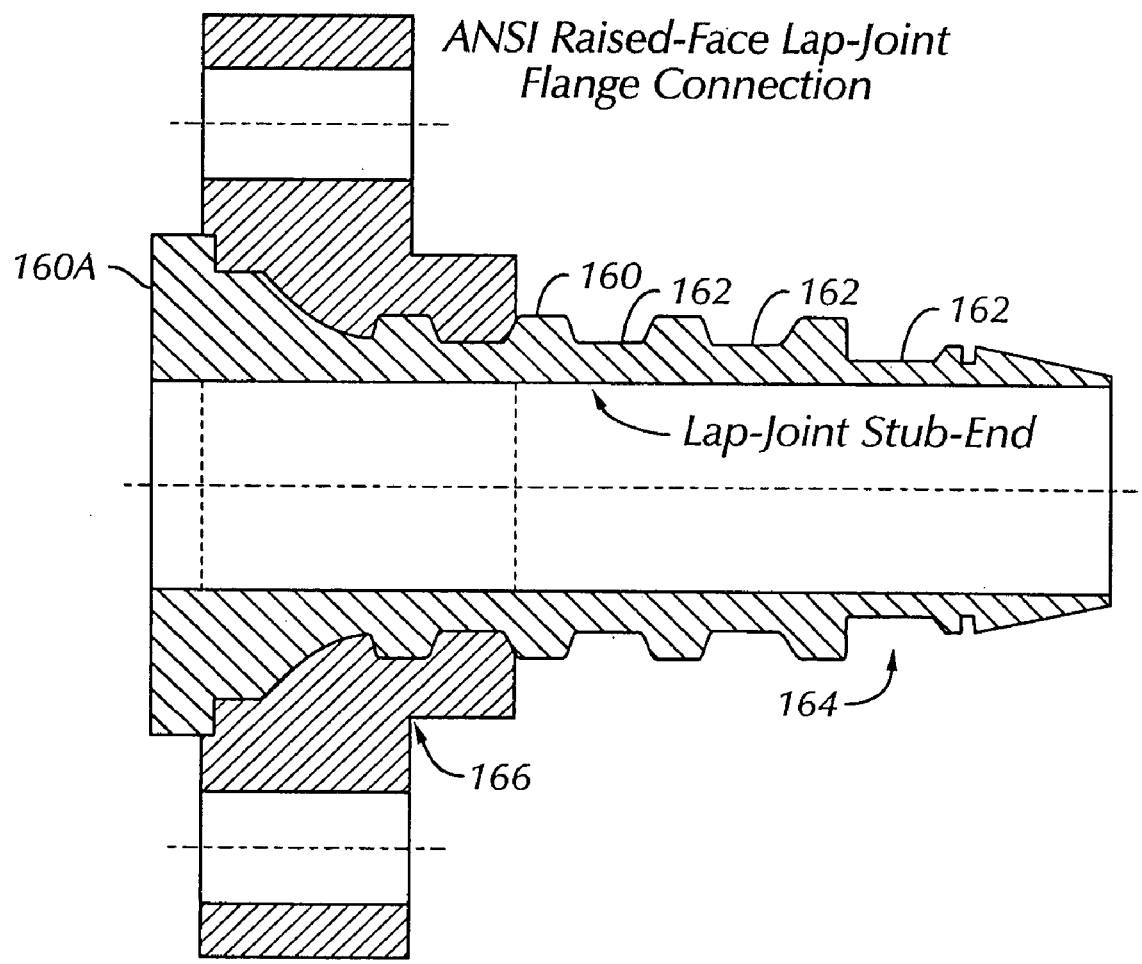
FIG. 16 shows an example of an ANSI Raised-Face Lap Joint flange connection which can be made using the method of the invention.

Another type of connection between a composite pipe and an end fitting or connector is shown in FIG. 16. The connection shown in FIG. 16 is one example of an ANSI Raised-Face Lap Joint flange connection. The connection shown in FIG. 16 can be made according to the following procedure. An already cured composite tube with a thermoplastic liner therein is cut-of to have a squared-off end. The composite reinforcing layer is cut back, exposing several inches of the underlying liner material. The liner is swaged (as previously described) to fit over the end of a connector 160 which includes a raised face 160A thereon. One or more resin-impregnated composite overwraps (typically, but not exclusively formed from braided tube, composite tapes, or woven composite cloth or the like), are placed around the end connector 160 and tightly clamped to the connection adjacent the rear of the flange 166. The composite over-wrap is pulled tight over the already-cured composite tube, and the distal end(s) are clamped to the composite tube. The braided tube, tapes or cloth are over-wrapped with shrink-wrap tape over their entire length and are then heat-cured. The heat of curing of the shrink wrap tape will cause the composite overwrap to be pulled-down into the traps 162, where the composite overwrap it will be cured under tension. The traps 162 can be filled with composite hoop wraps, which are then cured in the normal manner.

The advantages of the disclosed invention may include a connection for composite pipe with improved load bearing performance due to continuous tension being maintained on the composite fibers during manufacture. Other advantages may include reduced wall thickness of the connection.

While the invention has been disclosed with reference to specific examples of embodiments, numerous variations and modifications are possible. Therefore, it is intended that the invention not be limited by the description in the specification, but rather the claims that follow.

What is claimed is:

1. A method for making a connection for composite pipe comprising:
    attaching a connector having at least one liner trap and at least one trap to a liner portion of a segment of composite pipe, the pipe comprising a plurality of filament fibers wound around the liner;
    winding the plurality of filament fibers across the connector;
    compressing the plurality of filament fibers over the at least one trap; and
    curing a binder which impregnates the filament fiber, wherein tension is continuously maintained on the filament fibers across the at least one trap during winding and curing, so that the fibers forming the outer surface of the segment of composite pipe lack a microscopic waviness.

2. The method as defined in claim 1 wherein the fibers initially bridge the at least one trap.

3. The method as defined in claim 1 wherein the compressing comprises wrapping the fibers proximate the at least one trap with a fiber hoop wrap.

4. The method as defined in claim 3 wherein the fiber hoop wrap comprises a material having a negative coefficient of thermal expansion.

5. The method as defined in claim 1 further comprising wrapping the trap area with heat shrinkable tape and heating the tape.

6. The method as defined in claim 2 wherein the connector comprises a plurality of traps, the filament fibers wound under tension so that each of the traps is initially bridged by the filament fibers.

7. The method as defined in claim 6 further comprising compressing the filament fibers in each of the traps prior to curing the binder.

8. The method as defined in claim 7 wherein the compressing comprises wrapping the fibers in each of the traps with a fiber hoop wrap.

9. The method as defined in claim 8 wherein each of the hoop wraps has an elastic modulus related to its position with respect to an end of the connector.

10. The method as defined in claim 6 wherein a flank angle of each trap is related to the position of each trap with respect to an end of the connector.

11. The method as defined in claim 6 wherein a depth of each trap is related to the position of each trap with respect to an end of the connector.

12. The method as defined in claim 6 wherein a width of each trap is related to the position of each trap with respect to an end of the connector.

13. The method of claim 1, wherein the attaching comprises:
heating an end of the liner to approximately 50–60% of a softening temperature of the liner;
inserting the connector into an interior of the liner such that the liner overlays the at least one liner trap on the connector;
cooling the liner;
winding hoop wraps over the liner portion overlaying the at least one liner trap; and
curing a resin impregnated in the hoop wraps.

14. The method of claim 1, further comprising installing an o-ring seal on the connector.

15. The method of claim 1, wherein the filament fibers are not truncated prior to the curing.

16. A method for making a connection for composite pipe comprising:
attaching a connector having at least one trap to a liner portion of a segment of composite pipe, the pipe comprising a plurality of filament fibers wound around the liner;
winding the plurality of filament fibers across the connector and on to a tensioning ring;
tensioning the filament fibers using the tensioning ring;
compressing the plurality of filament fibers over the at least one trap; and
curing a binder which impregnates the filament fiber, wherein tension is continuously maintained on the filament fibers across the at least one trap during winding and curing, so that the fibers forming the outer surface of the segment of composite pipe lack a microscopic waviness.

17. The method of claim 16, wherein the tensioning comprises moving the tensioning ring axially away from the composite pipe.

18. The method of claim 17, further comprising moving the tensioning ring to an axial position nearer the composite pipe and truncating the filament fibers.

19. The method of claim 16, wherein the compressing comprises wrapping the fibers in each of the traps with a fiber hoop wrap, wherein the fiber hoop wrap comprises a material having a negative coefficient of thermal expansion.

20. The method of claim 16, wherein the attaching comprises:
heating an end of the liner to approximately 50–60% of a softening temperature of the liner;
inserting the connector into an interior of the liner such that the liner overlays at least one liner trap on the connector;
cooling the liner;
winding hoop wraps over the liner portion overlaying the at least one liner trap; and
curing a resin impregnated in the hoop wraps.

21. The method of claim 16, wherein the connector comprises a plurality of traps, and wherein the filament fibers are tensioned with the tensioning ring such that each of the traps is bridged by the filament fibers prior to compression.

22. The method of claim 21, further comprising:
compressing the filament fibers in each of the traps prior to curing the binder;
wherein the compressing comprises wrapping the fibers in each of the traps with a fiber hoop wrap; and
wherein each of the hoop wraps has an elastic modulus related to its position with respect to an end of the connector.

23. The method of claim 16, further comprising installing an o-ring seal on the connector, wherein the liner overlays the o-ring seal and at least one trap on the connector.

* * * * *